UNITED STATES PATENT OFFICE.

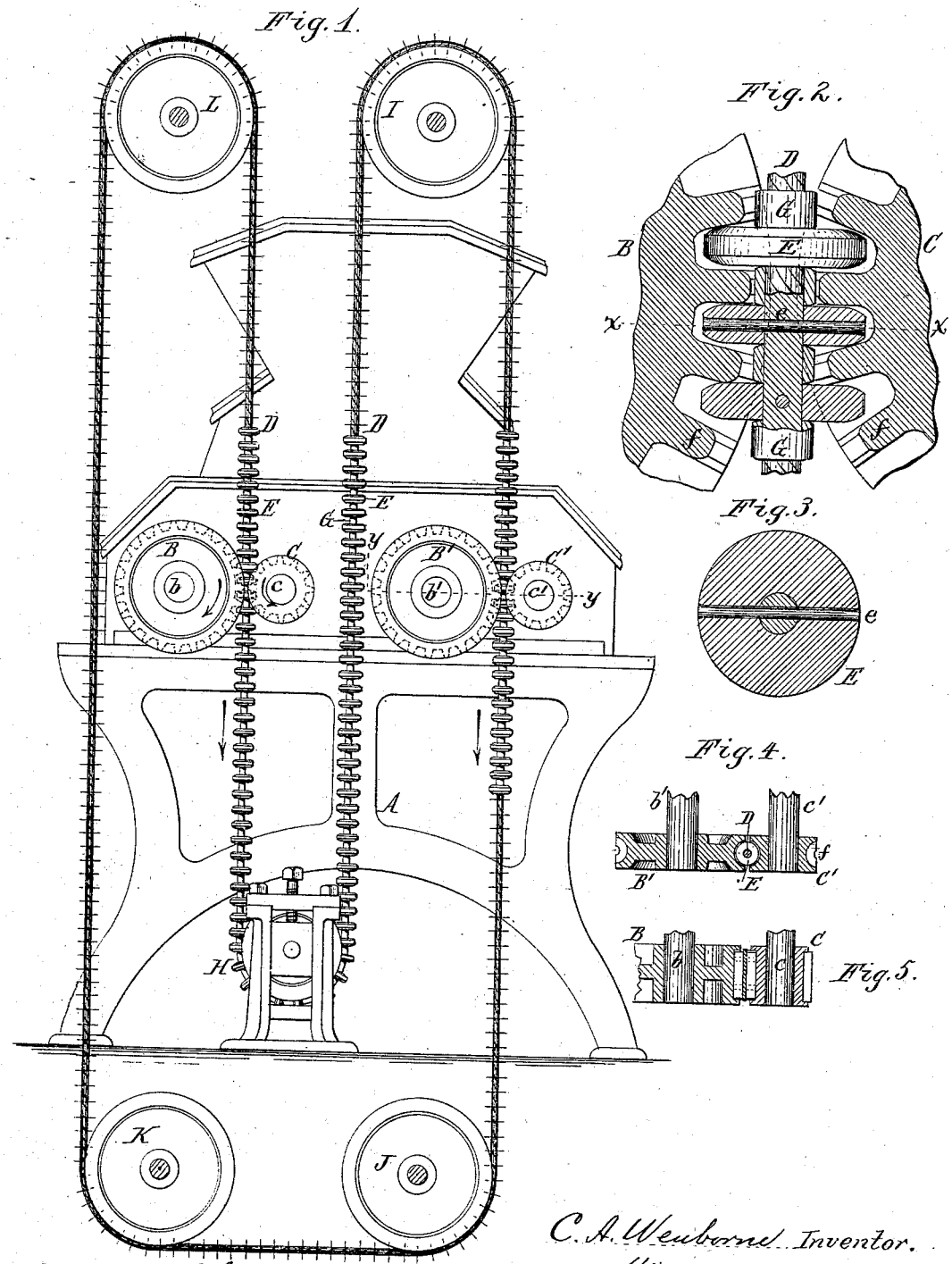

CHARLES A. WENBORNE, OF BUFFALO, NEW YORK.

MECHANICAL MOVEMENT.

SPECIFICATION forming part of Letters Patent No. 268,965, dated December 12, 1882.

Application filed October 17, 1882. (No model.)

*To all whom it may concern:*

Be it known that I, CHARLES A. WENBORNE, of the city of Buffalo, in the county of Erie and State of New York, have invented a new and useful Improvement in Mechanical Movements, of which the following is a specification.

This invention relates to an improvement in that class of mechanical movements in which motion is imparted from one pulley or wheel to another by means of a belt or rope traveling around said pulleys or wheels.

My invention is designed more particularly for use in roller-mills which employ two cylinders revolving at different peripheral rates of speed; and the object of my invention is to impart the required differential speed to these cylinders in a simple and positive manner, and with as little noise as possible.

My invention consists in combining with the pulleys to be driven a traveling belt, rope, or cable having projections which engage in recesses in the faces of said pulleys, and whereby the pulleys are rotated and caused to follow the movement of the belt without slipping, and also of the peculiar construction of the driving-belt, as will be hereinafter fully described, and pointed out in the claims.

In the accompanying drawings, Figure 1 is a side elevation of my improved mechanical movement applied to a roller-mill having two pairs of rollers. Fig. 2 is a fragmentary section of two of the pulleys and a portion of the driving-belt which imparts motion to the same. Fig. 3 is a cross-section of the driving-belt in line *x x*, Fig. 2. Fig. 4 is a horizontal section of two of the pulleys and the driving-belt in line *y y*, Fig. 1. Fig. 5 is a similar view, showing a modified construction of the driving-belt and pulleys.

Like letters of reference refer to like parts in the several figures.

A represents the supporting-frame of a roller-mill, and *b b'* the shafts of the slow rollers and *c c'* the shafts of the fast rollers.

B B' represent sprocket wheels or pulleys secured to the shafts *b b'*, and C C' represent sprocket wheels or pulleys secured to the shafts *c c'*. The wheels B B' are made so much larger in diameter than the wheels C C' that the proper differential peripheral rate of speed will be imparted to the rollers by imparting to the wheels B B' and C C' the same peripheral rate of speed.

D represents the endless driving belt, rope, or cable by which motion is imparted to the sprocket-wheels secured to the roller-shafts. This driving-belt passes between the adjacent faces of the two wheels secured to the shafts of the same pairs of rollers, and is provided with projections which are firmly secured to it, and which engage between the projections on the faces of the sprocket-wheels, and thereby rotate the same. As shown in Figs. 1 to 4, the projections with which the endless driving-belt is provided are composed of disks E, which are secured at uniform distances apart to the belt or rope by means of rivets *e*, or in any other suitable manner. The spaces between the disks E are so regulated that the disks will freely enter between the projections *f* on the faces of the sprocket-wheels, and impinge against said projections, and freely leave the same as the belt passes between the wheels, thus imparting motion to the same. The edges of the disks are preferably curved or beveled, as shown, to facilitate the entrance and exit of the disks into and from the spaces between the projections *f* of the sprocket-wheels. The projections *f* are made concave on their faces and bases to correspond with the curvature of the rope and disk, as clearly shown in Fig. 4, whereby the disks are held against lateral displacement, and the belt is prevented from running off the pulleys.

G represents a sleeve arranged around the cord or cable D between the disks E to relieve the strain on the fastenings by which the disks are secured to the cable.

Instead of a round rope or cable, as represented in Figs. 2 and 3, a flat belt may be used, having projections secured to both of its sides, which engage in cocks on the adjacent faces of the wheels, as represented in Fig. 5.

In the construction represented in Fig. 1 the driving-belt D passes downwardly between the pulleys B and C, thence around the lower side of an idler-pulley, H, thence upwardly and around the upper side of an idler-pulley, I, thence downwardly and between the wheels B' and C' to an idler-pulley, J, below, thence across to another idler-pulley, K, and thence upwardly to an idler-pulley, L, and thence downwardly to the wheels B and C, whereby both pairs of rollers are rotated at the desired differential speed by the same endless driving-belt. This mechanism imparts a positive motion to both wheels of the same pair of rollers, and prevents the slow rollers from gaining speed by contact with the fast rollers, and at the same time avoids much of the noise which accompanies the use of ordinary gear-wheels for this purpose.

I claim as my invention—

1. The combination, with two wheels provided with projections or sprockets, of a driving belt, rope, or cable provided with projections which engage between the projections of both wheels, whereby motion is transmitted simultaneously to both wheels, substantially as set forth.

2. The combination, with two wheels provided on their faces with projections $f$, of an endless rope or cable provided with disks E, adapted to engage simultaneously between the projections $f$ of both wheels, substantially as set forth.

3. The combination, with a rope or cable, D, of disks E, secured thereto, and sleeves G, arranged on the rope between said disks, substantially as set forth.

C. A. WENBORNE.

Witnesses:
JNO. J. BONNER,
CHAS. F. GEYER.